(12) United States Patent
Kondo et al.

(10) Patent No.: US 10,679,103 B2
(45) Date of Patent: Jun. 9, 2020

(54) INFORMATION PROCESSING APPARATUS AND PROCESSING METHOD FOR IMAGE DATA

(71) Applicant: Hitachi, Ltd., Tokyo (JP)

(72) Inventors: Yuki Kondo, Tokyo (JP); Katsuto Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 15/992,246

(22) Filed: May 30, 2018

(65) Prior Publication Data

US 2018/0373964 A1 Dec. 27, 2018

(30) Foreign Application Priority Data

Jun. 27, 2017 (JP) ................................. 2017-125304

(51) Int. Cl.
*G06K 9/62* (2006.01)
*G06T 7/194* (2017.01)
(Continued)

(52) U.S. Cl.
CPC ....... *G06K 9/6268* (2013.01); *G06K 9/00288* (2013.01); *G06K 9/6227* (2013.01);
(Continued)

(58) Field of Classification Search
CPC .. G06K 9/6268; G06K 9/6227; G06K 9/6262; G06K 9/6288; G06K 9/6274;
(Continued)

(56) References Cited

U.S. PATENT DOCUMENTS

2007/0025622 A1\* 2/2007 Simard, III ........ G06K 9/00456
382/232
2011/0044536 A1\* 2/2011 Cobb ...................... G06K 9/46
382/165
(Continued)

FOREIGN PATENT DOCUMENTS

JP 2014-216831 A 11/2014

OTHER PUBLICATIONS

Tatsuo Kozakaya, et al., "Add-on Type Image Analysis Box for Realization of Intelligent Surveillance Camera Network Systems," Toshiba review, 2014, vol. 69 No. 4, pp. 41-44.

*Primary Examiner* — Qian Yang
(74) *Attorney, Agent, or Firm* — Mattingly & Malur, PC

(57) ABSTRACT

Provided is an information processing apparatus configured to convert image data that has been input into saved data to save in a storage unit and reproduce the image data from the saved data. The information processing apparatus includes: an encoder unit configured to convert the image data into the saved data; and a decoder unit configured to reproduce the saved data as the image data. The encoder unit includes: a recognition unit configured to generate class tag information from the image data that has been input; a segmentation unit configured to generate region information that distinguishes a recognition target region and a background region from the image data that has been input; and a region separation unit configured to generate a background image according to the background region from the image data that has been input based on the region information.

14 Claims, 16 Drawing Sheets

(51) Int. Cl.
*G06K 9/00* (2006.01)
*G06T 7/11* (2017.01)
*G06T 5/50* (2006.01)

(52) U.S. Cl.
CPC ......... *G06K 9/6262* (2013.01); *G06K 9/6274* (2013.01); *G06K 9/6288* (2013.01); *G06T 5/50* (2013.01); *G06T 7/11* (2017.01); *G06T 7/194* (2017.01); *G06K 2209/27* (2013.01); *G06T 2207/20081* (2013.01); *G06T 2207/20221* (2013.01)

(58) Field of Classification Search
CPC .. G06K 9/00288; G06K 2209/27; G06T 5/50; G06T 7/11; G06T 7/194; G06T 2207/20221; G06T 2207/20081
See application file for complete search history.

(56) References Cited

U.S. PATENT DOCUMENTS

2017/0116743 A1* 4/2017 Matsumoto ........ G06K 9/00805
2018/0308281 A1* 10/2018 Okoyama ............... G06T 19/00

* cited by examiner

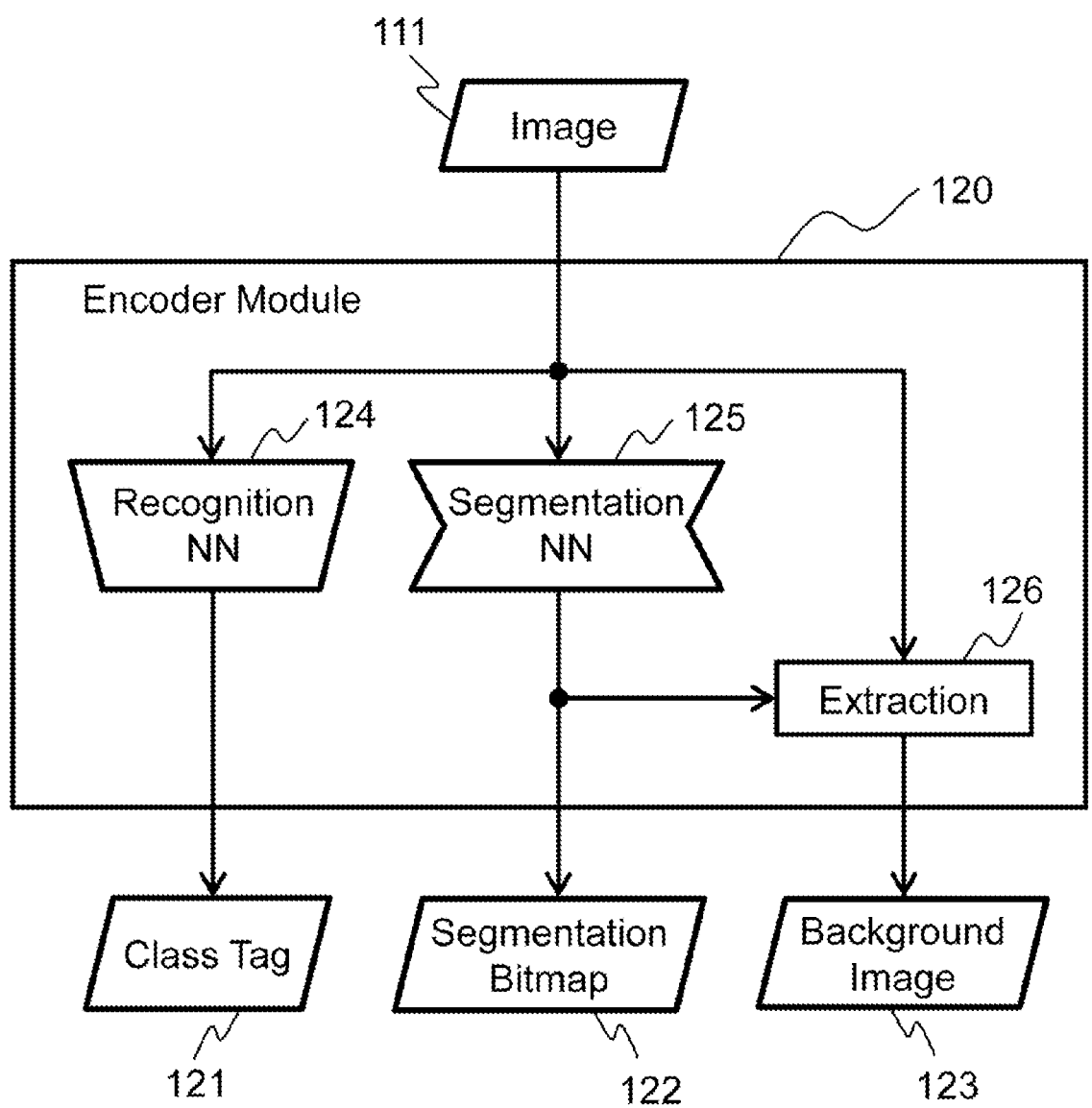

INFORMATION PROCESSING APPARATUS AND PROCESSING METHOD FOR IMAGE DATA

CLAIM OF PRIORITY

The present application claims priority from Japanese patent application JP 2017-125304 filed on Jun. 27, 2017, the content of which is hereby incorporated by reference into this application.

BACKGROUND OF THE INVENTION

1. Field of the Invention

The present invention relates to a technology for processing image data acquired from a sensor, a camera, or the like and compressing the image data to hold.

2. Description of the Related Art

In recent years, efforts to realize a smart society by acquiring a large amount of data using sensors and cameras and analyzing the data using artificial intelligence technology are thriving. In such a system, while focusing on achieving efficient control, it is often difficult to determine a required data type and analysis method in advance. A flow is thus taken to hold a large amount of different types of data for a long time to analyze from various viewpoints later and, as a result, find an efficient control method.

In order to discover a more efficient control method, it is necessary to be able to analyze data all at once and, for this purpose, it is necessary to aggregate the data to one place such as a storage of a data center. However, in many cases, aggregating a large amount of different types of data to one place is difficult due to restrictions on communication capacity and accordingly, it is necessary to perform primary processes by allocating to edge devices close to data acquisition sources and aggregate the results of the primary processes to one place at the data center (or on a cloud) to perform a secondary process.

However, the edge device has many restrictions from the viewpoint of storage capacity and has difficulties in retaining a large amount of different types of data. Therefore, after the data obtained by processing at the edge device is transmitted to the data center, most of data before analysis is discarded, such that it is unfeasible to analyze the data later from a different viewpoint.

Among sensors installed in the observation environment, the amount of information generated by an image sensor such as a camera is large but the amount of data that can be accumulated in an edge processing device is greatly restricted. In addition, when the primary process result of the edge device is also saved, information indicating the same content is doubly present in image information and the primary process result. There occurs a contradictory situation that the information needs to be duplicated while restrictions on the data capacity to keep are severe.

JP 2014-216831 A discloses a technology in which a user sets a plurality of regions in an image of a surveillance camera and individually assigns a compression rate to each region.

"Add-on Type Image Analysis Box for Realization of Intelligent Surveillance Camera Network Systems", Tatsuo Kozakaya et al., Toshiba Review, Vol. 69 No. 4, pp. 41-44, 2014 (in particular, (2) to (5) in FIG. 5, p. 44) proposes a technique of suppressing the amount of information accumulated in an edge device by selectively recognizing a specific part such as a face part from an image of a surveillance camera and cutting out an image correlated with the part to hold, and a method of further reducing the amount of information by selectively accumulating a result of the recognition.

SUMMARY OF THE INVENTION

In the technology of JP 2014-216831 A mentioned above, since the compression rate is fixed for each preset region, there has been a case where image data of a surveillance target is not obtained at a desired resolution when the position of the surveillance target moves or the surveillance target is in motion. That is, since the compression rate is set for each fixed region to capture an image of the surveillance target, there has been a problem that it is difficult to previously limit the installation position and the angle of view of the camera, the position of a subject, and the operation range.

Meanwhile, in the technology of "Add-on Type Image Analysis Box for Realization of Intelligent Surveillance Camera Network Systems", Tatsuo Kozakaya et al., Toshiba Review, Vol. 69 No. 4, pp. 41-44, 2014 (in particular, (2) to (5) in FIG. 5, p. 44) mentioned above, since the original image is not held, there has been a problem that it is difficult to analyze what appears in a part other than the part of the preset recognition target.

The present invention has been made in view of the above problems and it is an object of the present invention to make it possible to hold image data that has been input in a restorable state on an image-by-image basis while suppressing the capacity of the image data and to carry out the reanalysis of the image data.

An aspect of the present invention is an information processing apparatus including a processor and a memory and being configured to convert image data that has been input into saved data to save in a storage unit and reproduce the image data from the saved data, the information processing apparatus including: an encoder unit configured to convert the image data into the saved data; and a decoder unit configured to reproduce the saved data as the image data, in which the encoder unit includes: a recognition unit configured to generate class tag information from the image data that has been input; a segmentation unit configured to generate region information that distinguishes a recognition target region and a background region from the image data that has been input; and a region separation unit configured to generate a background image according to the background region from the image data that has been input based on the region information.

Therefore, according to the present invention, a class tag, the region information that separates a recognition target and a background, and the background image can be independently converted for each piece of image data and compressed as the saved data as a whole. When the image data is reproduced, the original image data can be reproduced on a frame-by-frame basis by merging a reconstructed image generated from the class tag with the background image in accordance with the region information.

BRIEF DESCRIPTION OF THE DRAWINGS

FIG. 2 is a diagram illustrating an example of a process performed in an encoder module, illustrating the first embodiment of the present invention;

DESCRIPTION OF THE PREFERRED EMBODIMENTS

Hereinafter, modes for carrying out the present invention will be described based on the accompanying drawings.

First Embodiment

Figure 1A:
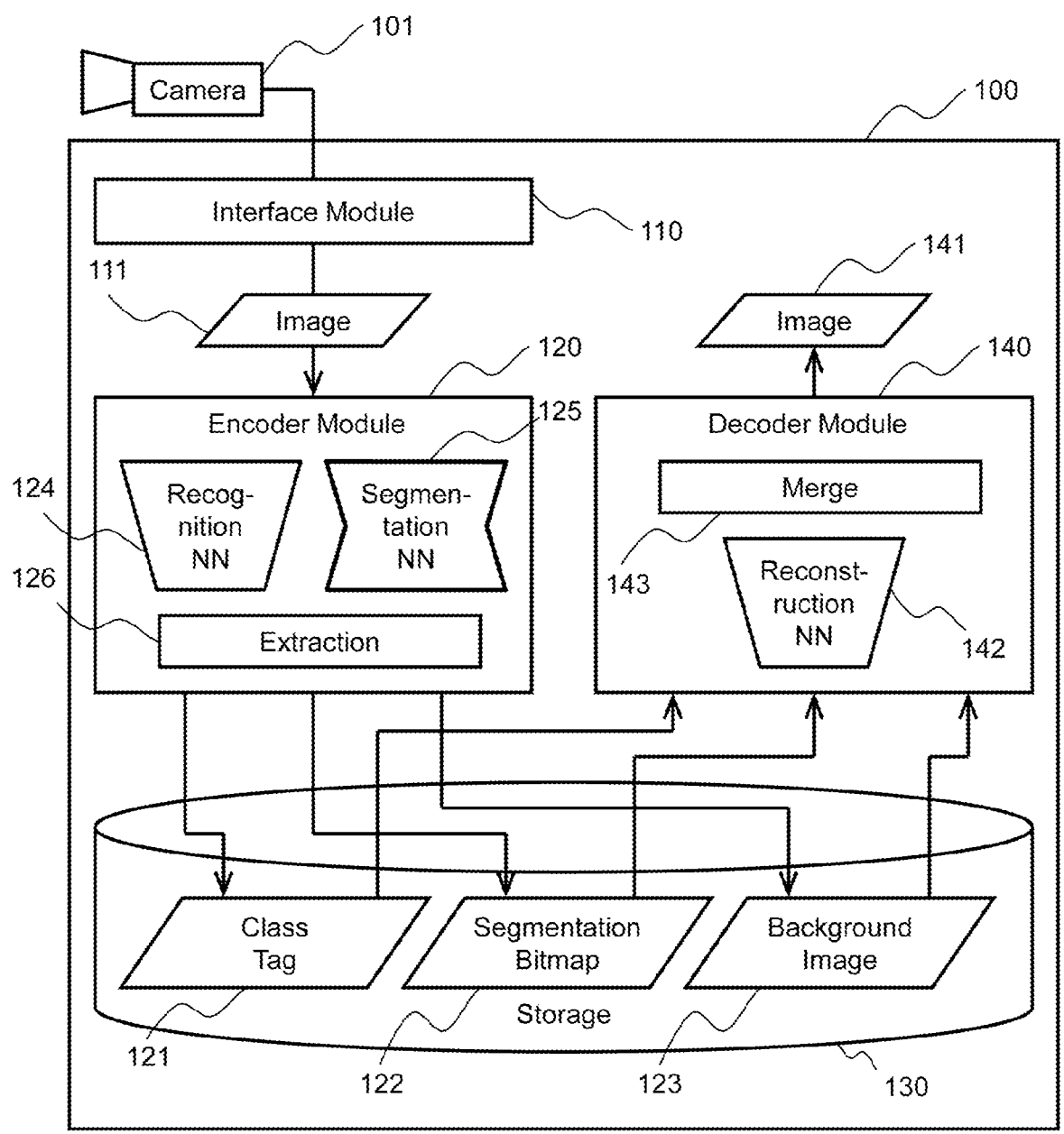
FIG. 1A is a diagram illustrating an example of functional elements of an information processing apparatus, illustrating a first embodiment of the present invention.

FIG. 1A is a diagram illustrating an example of functional elements of an information processing apparatus which implements the present invention. In FIG. 1A, reference numeral 100 denotes an information processing apparatus which implements the present invention and reference numeral 101 denotes an appliance connected to the information processing apparatus 100 to acquire an image, for example, a camera.

Reference numeral 110 denotes an interface module with the camera 101 and generates input image data 111 based on an input signal from the camera 101. The input image data 111 is kept as data in a memory included in the information processing apparatus 100. For example, in the case of a color image, it is possible to employ data as 24-bit value constituted by 8 bits according to each component of three primary colors of RGB per pixel and keep such values as data equivalent to the number of pixels.

Reference numeral 120 denotes an encoder module that processes the input image data 111 and outputs data necessary for reproducing an image later. The encoder module 120 includes a recognition unit (Recognition NN in FIG. 1A) 124 that recognizes the input image data 111, a segmentation unit (Segmentation NN in FIG. 1A) 125 that distinguishes a recognition target in the input image data 111 from a background other than the recognition target, and an extraction unit (Extraction in FIG. 1A) 126 that outputs the image of a background part of the input image data 111. In addition, the recognition unit 124 and the segmentation unit 125 each include a neural network (NN in FIG. 1A).

The encoder module 120 outputs a class tag (Class Tag in FIG. 1A) 121 which is an output of the recognition unit 124, a segmentation bitmap (Segmentation Bitmap in FIG. 1A) 122 which is an output of the segmentation unit 125, and a background image (Background Image in FIG. 1A) 123 output by the extraction unit 126 based on the input image data (Image in FIG. 1A) 111 and the segmentation bitmap 122, and writes these outputs to a storage 130. The procedure thus far is an example of data processing at the time of recording the input image data 111. Note that the storage 130 may be an external storage device.

The class tag 121 is constituted by metadata including a feature quantity and the like. For example, if the recognition target is a human body, the recognition unit 124 can calculate coordinate information on a skeleton point as a feature quantity to include into the class tag 121.

The segmentation bitmap 122 is region information constituted by the background image 123 and a binary bitmap that identifies an image region of the recognition target and the background region on a pixel basis. The segmentation unit 125 separates the region of the background image 123 and the image region of the recognition target from the input image data 111 to generate the segmentation bitmap 122.

Note that the first embodiment indicates an example in which the segmentation unit 125 separates the background image 123 from the image region of the recognition target on a pixel basis, but a plurality of neighboring pixels may be employed as a block such that the background image 123 is distinguished from the image region of the recognition target on a block basis.

The extraction unit 126 outputs a pixel of the input image data 111 to pixels of the background separated in the segmentation bitmap 122 to generate the background image 123.

For one frame, the encoder module 120 associates the class tag 121, the segmentation bitmap 122, and the background image 123 with each other to keep in the storage 130 as the saved data.

Next, data processing at the time of reproduction will be described. The decoder module 140 reads the saved data made up of the class tag 121, the segmentation bitmap 122, and the background image 123 recorded in the storage 130 and outputs image data 141 to serve as a reproduced image from the saved data.

The decoder module 140 includes a reconstruction unit (Reconstruction NN in FIG. 1A) 142 that reconstructs the image of the recognition target from the class tag 121 and a merging unit (Merge in FIG. 1A) 143 that merges an output of the reconstruction unit 142 with the segmentation bitmap 122 and the background image 123. In addition, the reconstruction unit 142 includes a neural network (NN in FIG. 1A).

The reconstruction unit 142 generates the image of the recognition target from the class tag 121 as a reconstructed image and the merging unit 143 reproduces one piece of the image data 141 from the segmentation bitmap 122, the reconstructed image, and the background image 123.

Figure 1B:
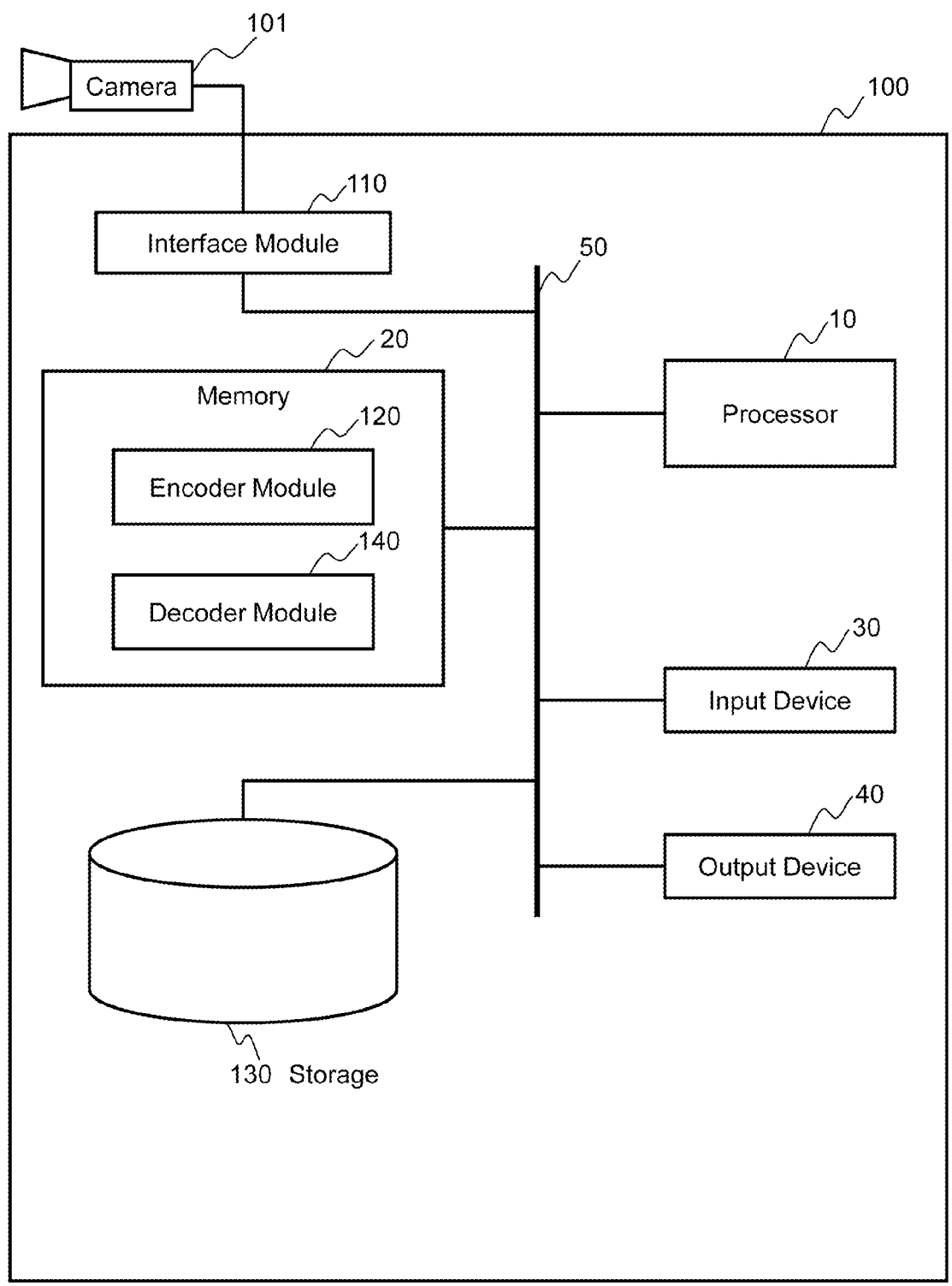
FIG. 1B is a block diagram illustrating an example of the configuration of the information processing apparatus, illustrating the first embodiment of the present invention.

FIG. 1B is a block diagram illustrating an example of the configuration of the information processing apparatus 100. The information processing apparatus 100 is a computer in which a processor 10, a memory 20, the storage 130, an input device 30, an output device 40, and an interface module 110 are mutually connected via a bus 50.

The respective functional units, namely, the recognition unit 124 and the segmentation unit 125 constituting the encoder module 120 and the reconstruction unit 142 constituting the decoder module 140 illustrated in FIG. 1A are loaded into the memory 20 as programs.

The processor 10 works as a functional unit that provides a predetermined function by processing in accordance with the program of each functional unit. For example, the processor 10 functions as the recognition unit 124 by processing in accordance with a recognition program. The same applies to other programs. Furthermore, the processor 10 also works as a functional unit that provides each function of a plurality of processes executed by each program. The computer and a computer system are a device and a system including these functional units.

Information such as programs and tables that implement respective functions of the encoder module 120 and the decoder module 140 can be kept in a storage device such as the storage 130, a nonvolatile semiconductor memory, a hard disk drive, and a solid state drive (SSD), or a computer readable non-transitory data storage medium such as an integrated circuit (IC) card, an SD card, and a digital versatile disc (DVD).

In the first embodiment, the encoder module 120 and the decoder module 140 are assumed to be software programs loaded in the memory 20, but may be configured by hardware.

FIG. 2 is a diagram illustrating an example of a process performed in the encoder module 120. The recognition unit 124 processes the input image data 111 as described later and outputs the class tag 121. In addition, the segmentation unit 125 processes the input image data 111 as described later and outputs the segmentation bitmap 122 in which 1 is kept for the pixel of the recognition target and 0 is kept for the background in correspondence with the pixels of the input image data 111. The extraction unit 126 outputs the background image 123 from the input image data 111 and the segmentation bitmap 122.

As described thus far, in the encoder module 120 according to the first embodiment, one piece of the input image data 111 (one frame) that has been input is decomposed into the class tag 121 constituted by the metadata including the feature quantity, the segmentation bitmap 122 in which the recognition target and the background are separated, and the background image 123 and kept in the storage 130.

Since the image of the recognition target is kept in the class tag 121 as a feature quantity, the saved data of one frame made up of the class tag 121, the segmentation bitmap 122, and the background image 123 is compressed as compared with the input image data 111.

In addition, in a case where the camera 101 is fixed to perform fixed point observation, the background image 123 hardly varies. In such a capturing environment, it is possible to further improve the compression rate of the saved data by substituting a plurality of frames with the background image 123.

Figure 3:
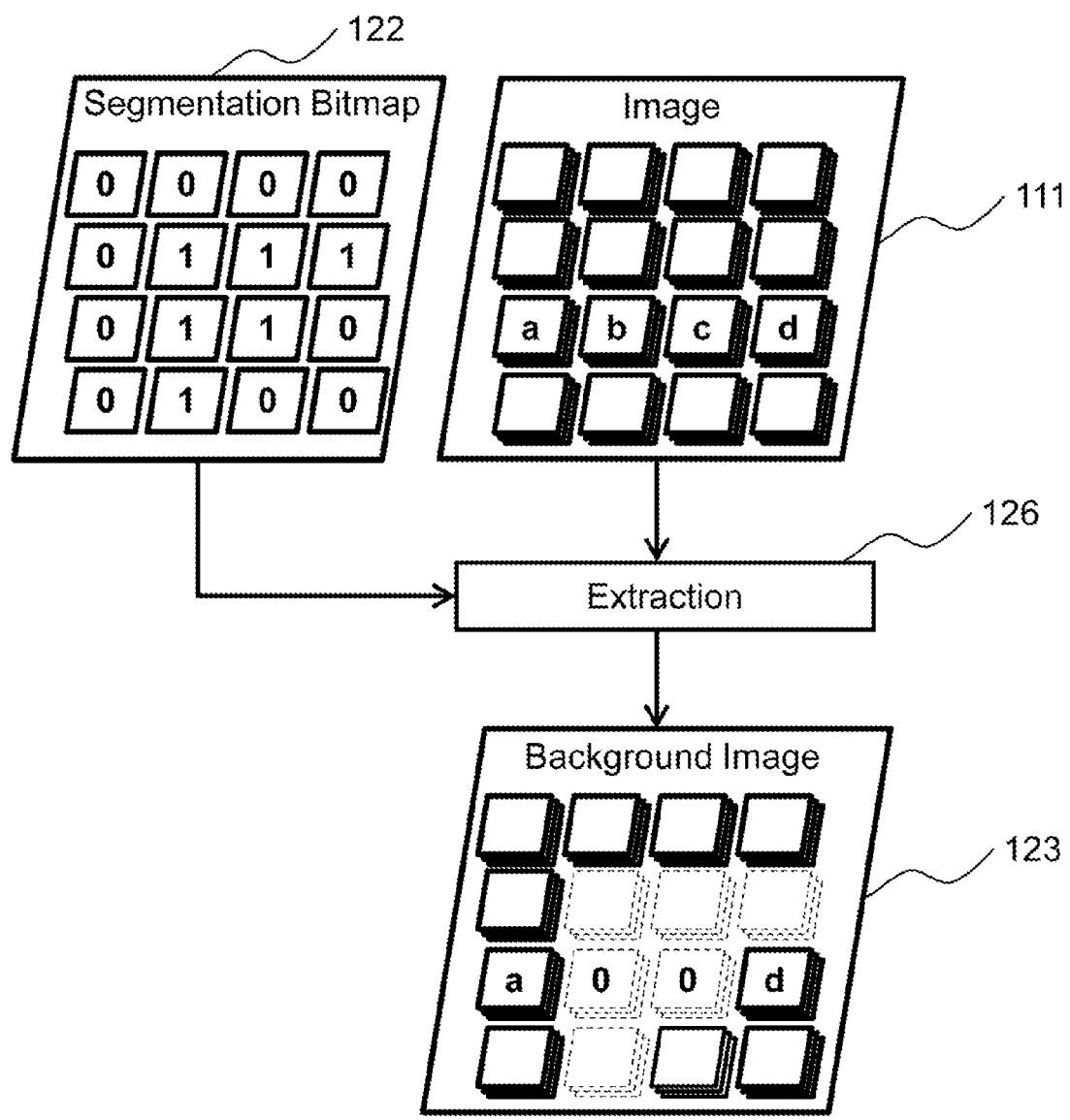
FIG. 3 is a diagram illustrating an example of a process performed in an extraction unit, illustrating the first embodiment of the present invention.

FIG. 3 is a diagram illustrating an example of a process performed in the extraction unit 126. The extraction unit 126 outputs the value of the pixel of the input image data 111 for the pixel whose value is specified as 0 in the segmentation bitmap 122 and outputs 0 for the pixel whose value is specified as 1 therein to output as the value of the pixel of the background image 123.

Next, the configuration of the recognition unit 124 will be explained. The recognition unit 124 is configured based on a computation model of the neural network. That is, the recognition unit 124 is configured by organizing inputs and outputs of a plurality of neurons in series based on a structure called a neuron on a process basis.

Figure 4:
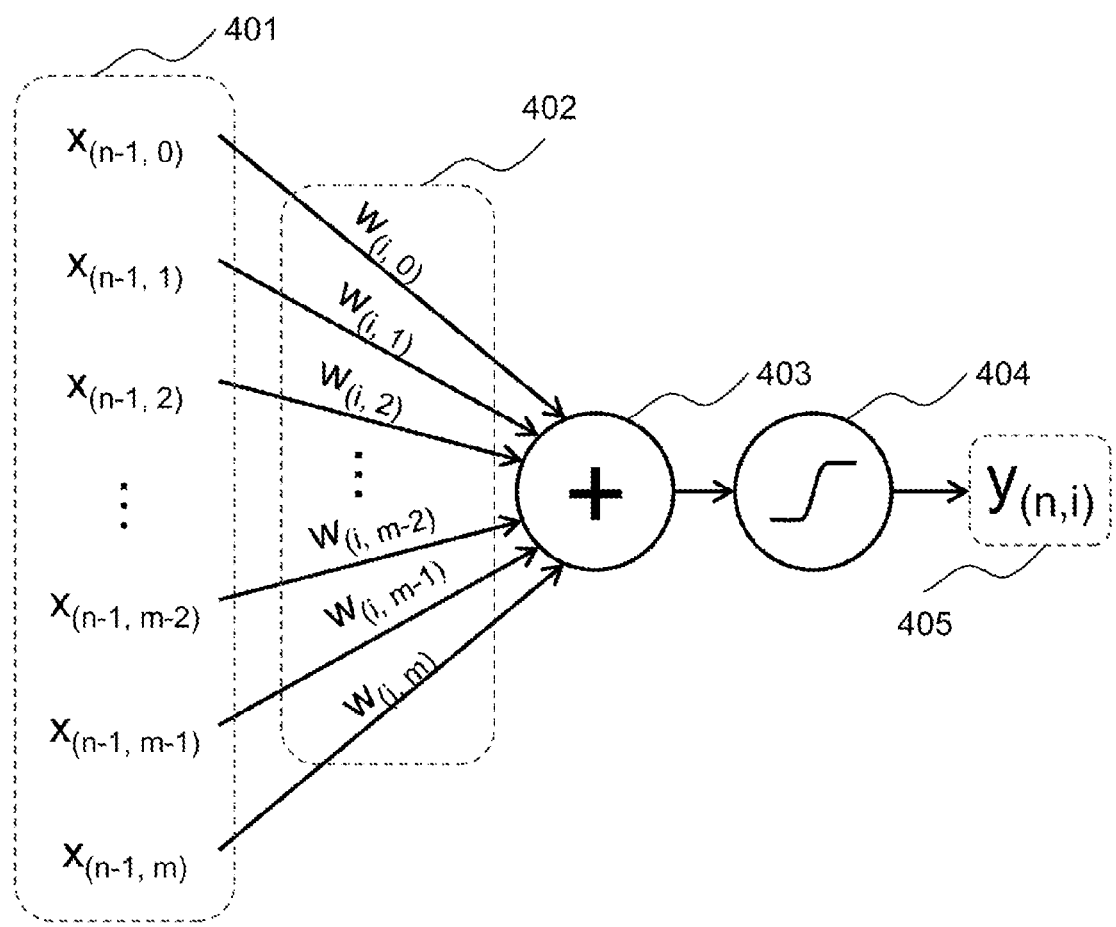
FIG. 4 is a diagram illustrating an example of a process performed in a neuron, illustrating the first embodiment of the present invention.

FIG. 4 is a diagram illustrating an example of a process performed in the neuron. Reference numeral 401 denotes a plurality of input values and reference numeral 402 denotes weighting factors for the input values. The results of multiplying the input values 401 by the weighting factors 402 are added in an adder 403. Reference numeral 404 denotes an activation function expressing a propagation characteristic from the input value to an output value and an arithmetic operation result of the activation function 404 is output to reference numeral 405.

In the process using the neural network, what is necessary for obtaining a desired output from the input is the above-mentioned weighting factor suitable for a specific process. However, such a weighting factor can be obtained beforehand by learning using inverse error propagation that uses a desired pair of input data and output data to adjust the weighting factor from a difference from the desired output data.

The recognition unit 124 is constituted by a neural network having a weighting factor that has learned a correspondence of the class tag 121 beforehand as a desirable process result for the input image data 111. The learning method will be described later. This neural network may be configured, for example, using a convolutional neural network.

The configuration of the segmentation unit 125 will be explained. The segmentation unit 125 is configured based on a computation model of the neural network. The segmentation unit 125 is constituted by a neural network including a weighting factor that has learned a segmentation bitmap beforehand as a desirable process result for the input image data 111. The learning method of the neural network will be described later.

Figure 5:
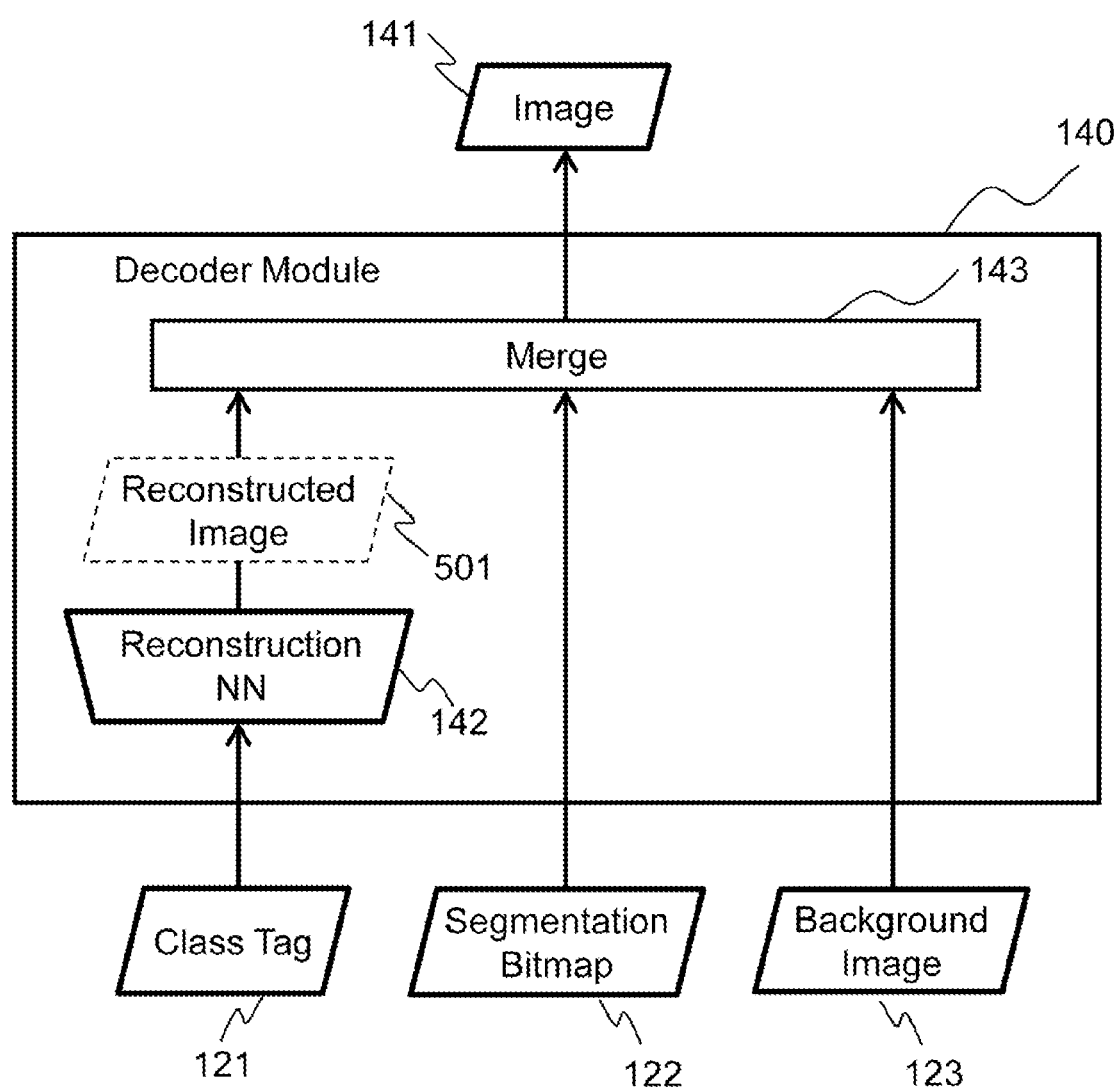
FIG. 5 is a diagram illustrating an example of a process performed in a decoder module, illustrating the first embodiment of the present invention.

FIG. 5 is a diagram illustrating an example of a process performed in the decoder module 140. The reconstruction unit 142 processes the class tag 121 and outputs a reconstructed image 501. In addition, the merging unit 143 processes the reconstructed image 501, the segmentation bitmap 122, and the background image 123 and outputs the reproduced image data 141.

Note that reproduction of the image data 141 can be carried out when the image data 141 to be reproduced by the information processing apparatus 100 is designated.

The decoder module 140 according to the first embodiment reproduces one frame of image data decomposed into the class tag 121 constituted by the metadata including the feature quantity, the segmentation bitmap 122 in which the recognition target and the background are separated, and the background image 123.

The reconstruction unit 142 generates the reconstructed image 501 from the feature quantity in the class tag 121, and the like using the class tag 121 as an input. Then, the merging unit 143 merges the reconstructed image 501, the segmentation bitmap 122, and the background image 123 to reproduce the image data 141.

As described above, in the first embodiment, the class tag 121 including the feature quantity, the segmentation bitmap 122 in which the recognition target and the background are separated, and the background image 123 are independently converted and the image of the recognition target is converted into the feature quantity for each frame, whereby the saved data can be compressed as a whole.

Additionally, when the image data is reproduced, the original image data 141 can be reproduced by arranging the reconstructed image 501 generated from the class tag 121 in accordance with the segmentation bitmap 122 and adding the background image 123. In the compression (conversion) and reproduction according to the first embodiment, even if the preceding and succeeding frames are missing, the image of the relevant frame can be reproduced. That is, the saved data of the first embodiment can be compressed and reproduced regardless of the presence or absence of the preceding and succeeding frames. In addition, in the first embodiment, by searching for the class tag 121, the retrieval and reproduction of image data can be implemented on a single frame basis.

Figure 6:
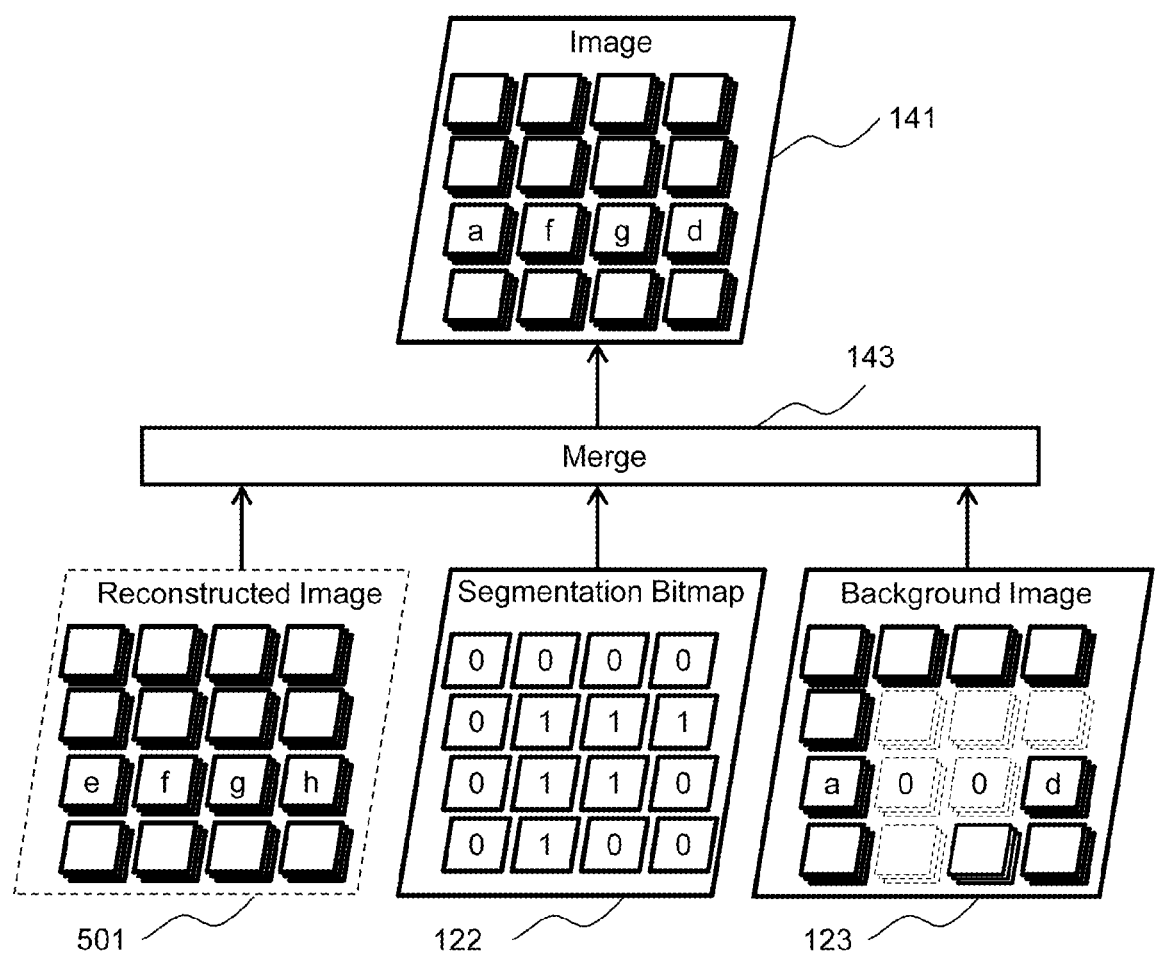
FIG. 6 is a diagram illustrating an example of a process performed in a merging unit, illustrating the first embodiment of the present invention.

FIG. 6 is a diagram illustrating an example of a process performed in the merging unit 143. The merging unit 143 outputs the value of the pixel of the background image 123 for the pixel whose value is specified as 0 in the segmentation bitmap 122 and outputs the value of the pixel of the reconstructed image 501 for the pixel whose value is specified as 1 therein to output as the value of the pixel of the image data 141 to be reproduced.

Next, the configuration of the reconstruction unit 142 will be explained. The reconstruction unit 142 is configured based on a computation model of the neural network. The reconstruction unit 142 is constituted by a neural network including a weighting factor that has learned the image data 141 beforehand as a desirable process result for the class tag 121.

Figure 7:
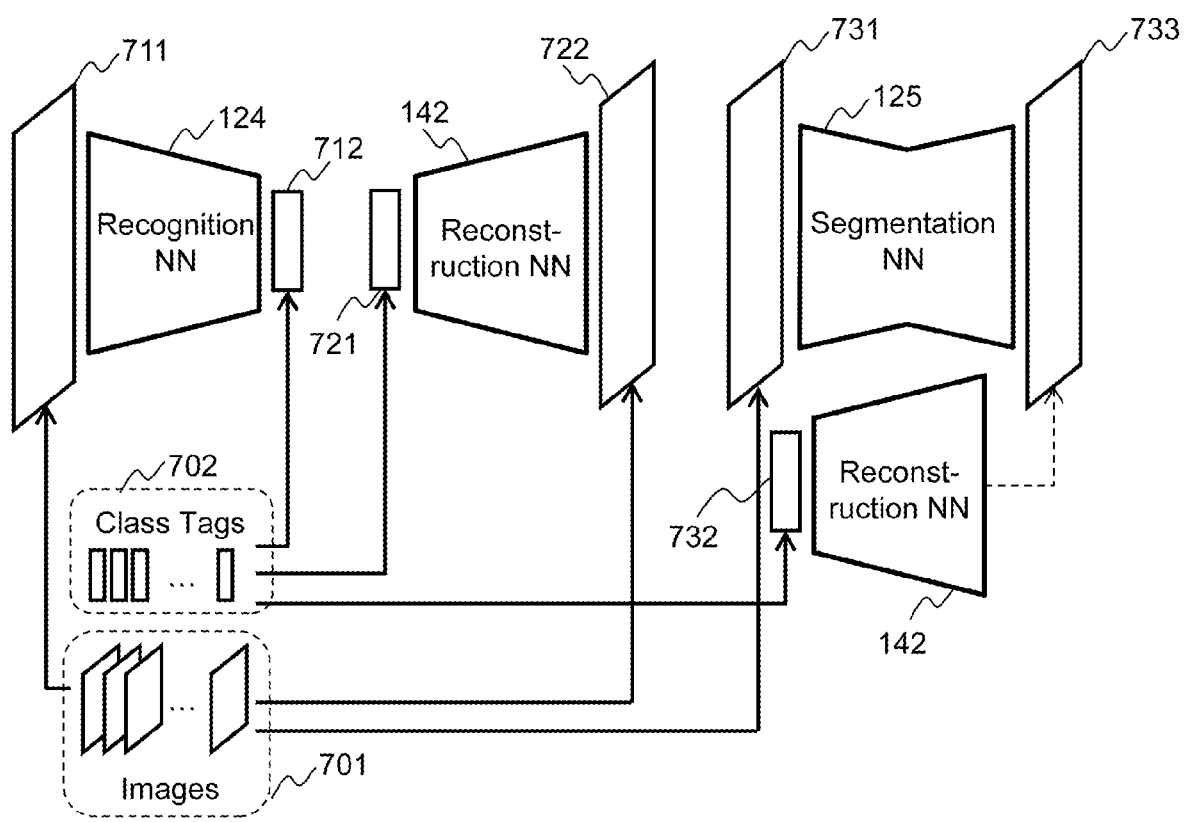
FIG. 7 is a diagram illustrating an example of a process of giving teacher data to neural networks of a recognition unit, a reconstruction unit, and a segmentation unit, illustrating the first embodiment of the present invention.

FIG. 7 is a diagram illustrating an example of how to give teacher data for obtaining the weighting factors beforehand by learning to the recognition unit 124, the segmentation unit 125, and the reconstruction unit 142 constituted by the neural networks.

The recognition unit 124 employs an input image group 701 and a class tag group 702 which produces desirable process results for respective images as the teacher data and gives images in the input image group 701 to an input side 711 of the recognition unit 124. The recognition unit 124 then computes errors between the obtained outputs and the class tags in the class tag group 702 on an output side 712 as a loss function and updates the weighting factors by an inverse error propagation method. The recognition unit 124 performs this process a plurality of times to obtain final weighting factors. As the class tag group 702, for example, it is sufficient to give a correct feature quantity corresponding to each one in the input image group 701.

Similarly, the reconstruction unit 142 employs the input image group 701 and the class tag group 702 as the teacher data but gives the class tags in the class tag group 702 to an input side 721 of the reconstruction unit 142. The reconstruction unit 142 then computes errors between the obtained outputs and the images in the input image group 701 on an output side 722 as a loss function and updates the weighting factors by the inverse error propagation method. The reconstruction unit 142 performs this process a plurality of times to obtain final weighting factors.

The segmentation unit 125 likewise employs the input image group 701 and the class tag group 702 as the teacher data. The images in the input image group 701 are given to an input side 731 of the segmentation unit 125. The segmentation unit 125 computes errors between the obtained outputs and images serving as references on an output side 733 as a loss function, where images (733) obtained by giving the class tags in the class tag group 702 to the reconstruction unit 142 on an input side 732 and binarizing the obtained outputs are used as the images serving as references. The segmentation unit 125 updates the weighting factors by the inverse error propagation method and performs this process a plurality of times to obtain final weighting factors.

As described above, in the first embodiment, the class tag 121 including the feature quantity, the segmentation bitmap 122 in which the recognition target and the background are separated, and the background image 123 are independently converted for each piece of the input image data 111 (frame), whereby the saved data can be compressed as a whole.

The neural networks of the recognition unit 124, the reconstruction unit 142, and the segmentation unit 125 can learn the weighting factors using the inverse error propagation method by giving a pair of the input image group 701 and the class tag group 702 serving as the correct feature quantities as the teacher data as described above. As for the segmentation unit 125, it is possible to calculate the weighting factors by giving, with the input image group 701 as inputs, the output (733) of the reconstruction unit 142 obtained by employing the class tags as inputs to the output side as the correct answer.

When the image data is reproduced, the original image data 141 can be reproduced on a single frame basis by merging the reconstructed image 501 generated from the class tag 121 with the background image 123 in accordance with the segmentation bitmap 122.

As in the first embodiment, by providing the recognition unit 124 including a neural network that converts the recognition target in the input image data 111 from an image to the feature quantity (or the metadata), the segmentation unit 125 including a neural network that separates the image into the recognition target and a part other than the recognition target (for example, a background), and the reconstruction unit 142 including a neural network that generates the reconstructed image 501 from the feature quantity, one piece of the input image data 111 can be divided into the class tag 121, the segmentation bitmap 122, and the background image 123 to be accumulated.

In addition to compressing the image data of the recognition target by converting the image data of the recognition target into the feature quantity to keep in the class tag 121, by treating the background image 123 as image data that does not almost vary when the camera 101 performs fixed point observation, it is possible to further improve the compression rate of the image data.

Furthermore, when the image is reproduced, the original image data 141 can be restored on a single frame basis from the saved data constituted by the class tag 121, the segmentation bitmap 122, and the background image 123. This makes it possible to reanalyze the image data by changing the stance and viewpoint and it becomes possible to effectively use the captured image data.

Note that the recognition target in the input image data 111 can be changed according to the teacher data to be learned by the neural network of the recognition unit 124 and is not limited to the human body as described above. It is possible to apply also to an object or the like.

In addition, by adapting the saved data accumulated in the information processing apparatus 100 to the feature quantity (class tag 121), the region information (segmentation bitmap 122), and the background image 123, the compression rate of the saved data can be improved as a whole, allowing data to be accumulated and reanalyzed over time.

Second Embodiment

Figure 8:
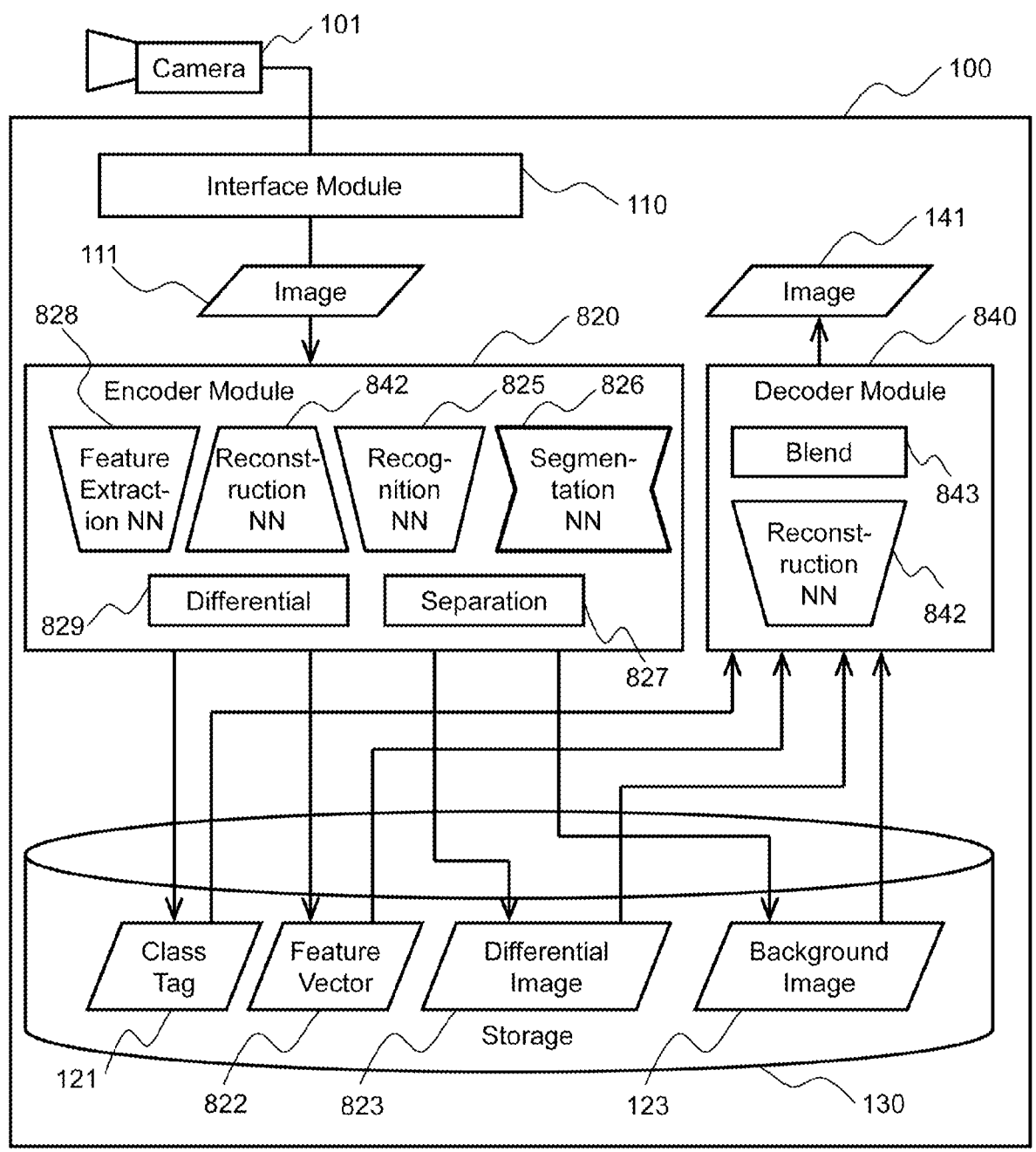
FIG. 8 is a block diagram illustrating an example of functional elements of an information processing apparatus, illustrating a second embodiment of the present invention.

FIG. 8 is a diagram illustrating an example of functional elements of an information processing apparatus 100 according to a second embodiment of the present invention. The information processing apparatus 100 acquires input image data 111 from a camera 101 connected via an interface module 110.

Reference numeral 820 denotes an encoder module that processes the input image data 111. The encoder module 820 includes a segmentation unit (Segmentation NN in FIG. 8) 826 that distinguishes the recognition target in the input image data 111 from a background other than the recognition target, a separation unit (Separation in FIG. 8) 827 that separates the input image data 111 into a recognition target part and a background part and outputs respective images, a recognition unit (Recognition NN in FIG. 8) 825 that recognizes the recognition target part, a feature extraction unit (Feature Extraction NN in FIG. 8) 828 that extracts the feature quantity of the recognition target part, a reconstruction unit (Reconstruction NN in FIG. 8) 842 that reconstructs an image, and a differential unit (Differential in FIG. 8) 829 that outputs a difference between images.

In addition, the segmentation unit 826, the recognition unit 825, the feature extraction unit 828, and the reconstruction unit 842 each include a neural network (NN in FIG. 8).

The encoder module 820 outputs a class tag 821 which is an output of the recognition unit 825, a feature vector (Feature Vector in FIG. 8) 822 which is an output of the feature extraction unit 828, a differential image (Differential Image in FIG. 8) 823 which is an output of the differential unit (differential extraction unit) 829, and a background image 824 separated and output as the background part by the separation unit (region separation unit) 827 to write these outputs in a storage 130. The above data is arithmetically operated at the time of recording the input image data 111 and kept in the storage 130.

Next, data processing at the time of reproduction will be described. The decoder module 840 reads the saved data made up of the class tag 821, the feature vector 822, the differential image (recognition differential image) 823, and the background image 824 recorded in the storage 130 on a frame-by-frame basis and outputs reproduced image data 841 to serve as a reproduced image from the saved data.

The decoder module 840 includes a reconstruction unit (Reconstruction NN in FIG. 8) 842 that reconstructs the image of the recognition target from the class tag 821 and the feature vector 822, and a blending unit (Blend in FIG. 8) 843 that blends the output of the reconstruction unit 842 with the differential image 823 and the background image 824.

The reconstruction unit 842 of the decoder module 840 can be constituted by the same components as the reconstruction unit 842 of the encoder module 820.

Note that the information processing apparatus 100 is the same as that in FIG. 1B of the first embodiment described above and assumed to be constituted by, for example, a computer including a central processing unit CPU and a memory, in which case the encoder module 820 and the decoder module 840 are assumed to be software programs and only required to have a constitutional form which can be assumed within a generally known or publicly known technological range.

Figure 9:
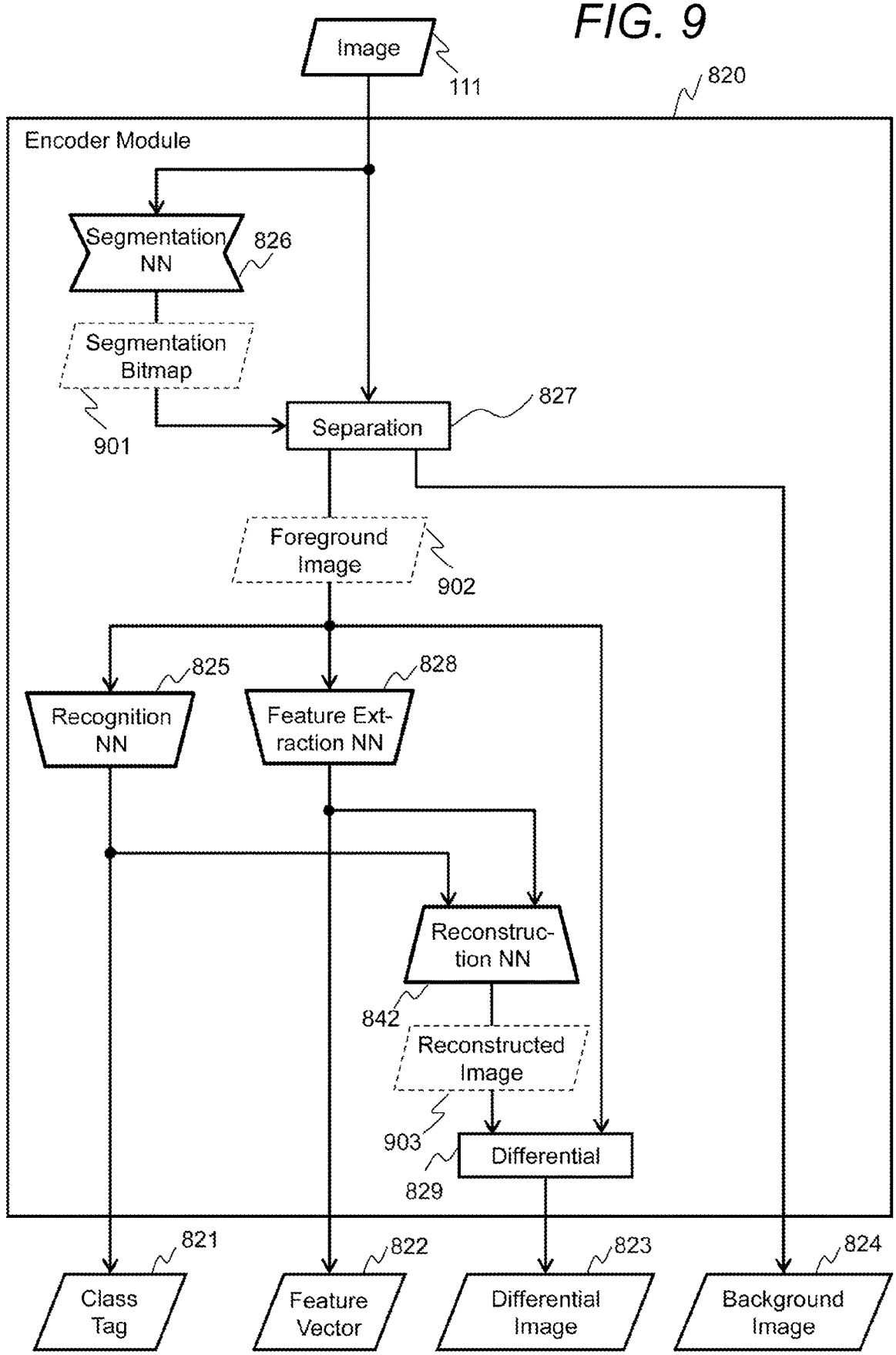
FIG. 9 is a diagram illustrating an example of a process performed in an encoder module, illustrating the second embodiment of the present invention.

FIG. 9 is a diagram illustrating an example of a process performed in the encoder module 820. The segmentation unit 826 processes the input image data 111 to identify the recognition target part and outputs a segmentation bitmap 901 in which 1 is kept for the pixel of the recognition target and 0 is kept for the background in correspondence with the pixels of the input image data 111.

The separation unit 827 outputs a recognition target image (Foreground Image in FIG. 9) 902 and a background image 824 from the input image data 111 and the segmentation bitmap 901. The recognition unit 825 processes the recognition target image 902 and outputs the class tag 821. The class tag 821 is the same as that in the first embodiment and can be constituted by metadata including the feature quantity of the recognition target image 902.

In addition, the feature extraction unit 828 processes the recognition target image 902 and outputs the feature vector 822. The feature vector 822 is constituted by previously learned elements such as distortion magnitude and thickness.

The reconstruction unit 842 generates and outputs the reconstructed image 903 obtained by reconstructing the recognition target part from the class tag 821 and the feature vector 822. The differential unit 829 outputs the differential image 823 from the reconstructed image 903 and the recognition target image 902.

That is, the differential image 823 is constituted by differential data between the reconstructed image 903 estimated by the reconstruction unit 842 with the class tag 821 and the feature vector 822 as inputs, and the actual recognition target image 902 output by the separation unit 827. In other words, the differential image 823 functions as correction information for the reconstructed image 903 estimated by the reconstruction unit 842.

The information processing apparatus 100 associates the class tag 821, the feature vector 822, the differential image 823, and the background image 824 with each other to accumulate in the storage 130 on a single frame basis.

Figure 10:
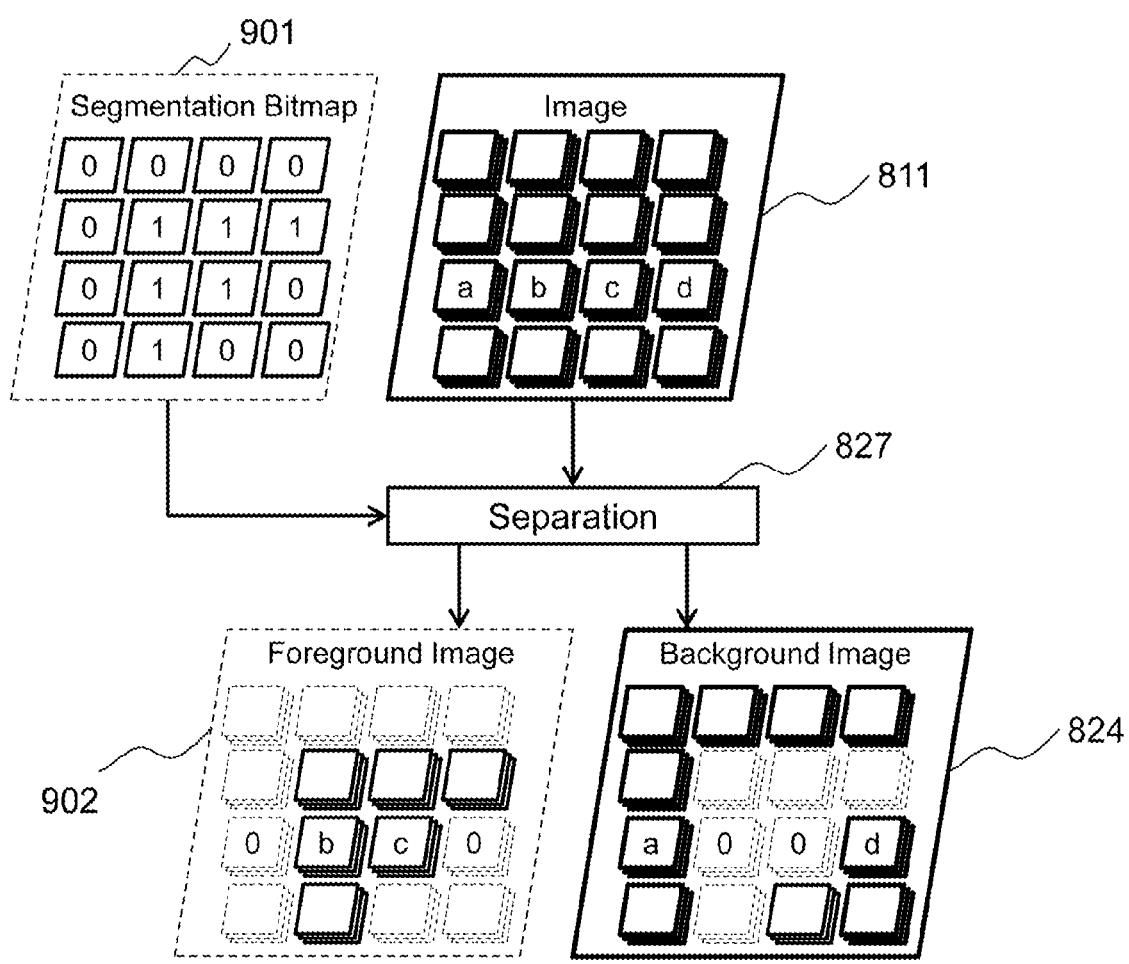
FIG. 10 is a diagram illustrating an example of a process performed in a separation unit, illustrating the second embodiment of the present invention.

FIG. 10 is a diagram illustrating an example of a process performed in the separation unit 827. For the pixel whose value is specified as 0 in the segmentation bitmap 901, the separation unit 827 outputs the value of the pixel of the input image data 111 for the corresponding pixel of the background image 824 and outputs 0 for the corresponding pixel of the recognition target image 902 to output as the background image 824.

On the other hand, for the pixel whose value is specified as 1 in the segmentation bitmap 901, the separation unit 827 outputs the value of the input image data 111 for the corresponding pixel of the recognition target image 902 and outputs 0 for the corresponding pixel of the background image 824 to output as the recognition target image 902.

Figure 11:
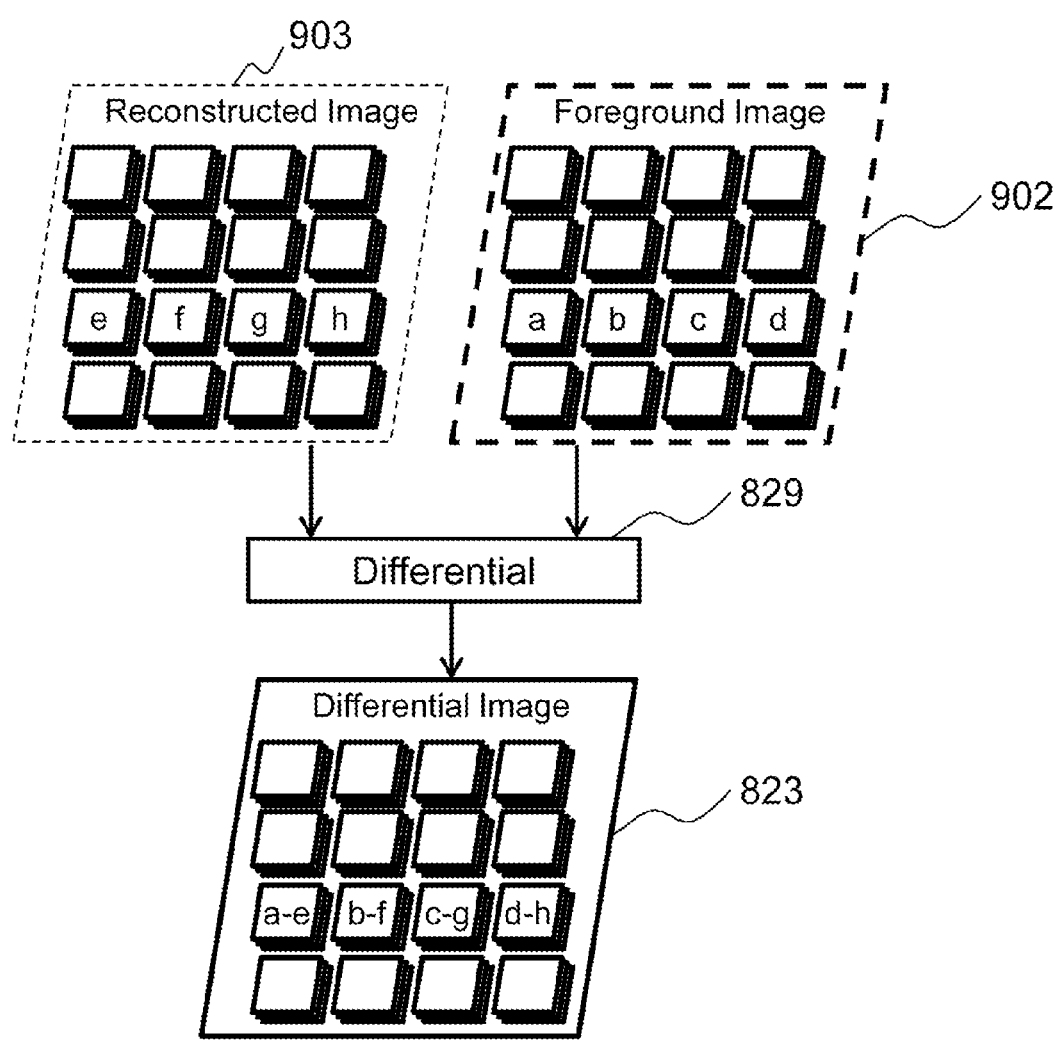
FIG. 11 is a diagram illustrating an example of a process performed in a differential unit, illustrating the second embodiment of the present invention.

FIG. 11 is a diagram illustrating an example of a process performed in the differential unit 829. The differential unit 829 subtracts the value of the corresponding pixel of the reconstructed image 903 from the value of the pixel of the recognition target image 902 to output as the differential image 823. That is, the differential image 823 is constituted by an error between the reconstructed image 903 estimated by the reconstruction unit 842 and the actual recognition target image 902.

The configuration of the recognition unit 825 will be explained. The recognition unit 825 is constituted based on a computation model of the neural network and is constituted by a neural network having a weighting factor that has learned the class tag beforehand as a desirable process result output for the input image data 111. The learning method will be described later.

The configuration of the segmentation unit 826 will be explained. The segmentation unit 826 is constituted based on a computation model of the neural network and is constituted by a neural network having a weighting factor that has learned the segmentation bitmap beforehand as a desirable process result output for the input image data 111. The learning method will be described later.

The configuration of the feature extraction unit 828 will be explained. The feature extraction unit 828 is constituted based on a computation model of the neural network and is constituted by a neural network including a weighting factor that has learned the feature vector beforehand as a desirable process result output for the input image data 111. The learning method will be described later.

The configuration of the reconstruction unit 842 will be explained. The reconstruction unit 842 is constituted based on a computation model of the neural network and is constituted by a neural network including a weighting factor that has learned the reconstructed image beforehand as a desirable process result output for the class tag and the feature vector as inputs. The learning method will be described later.

Figure 12:
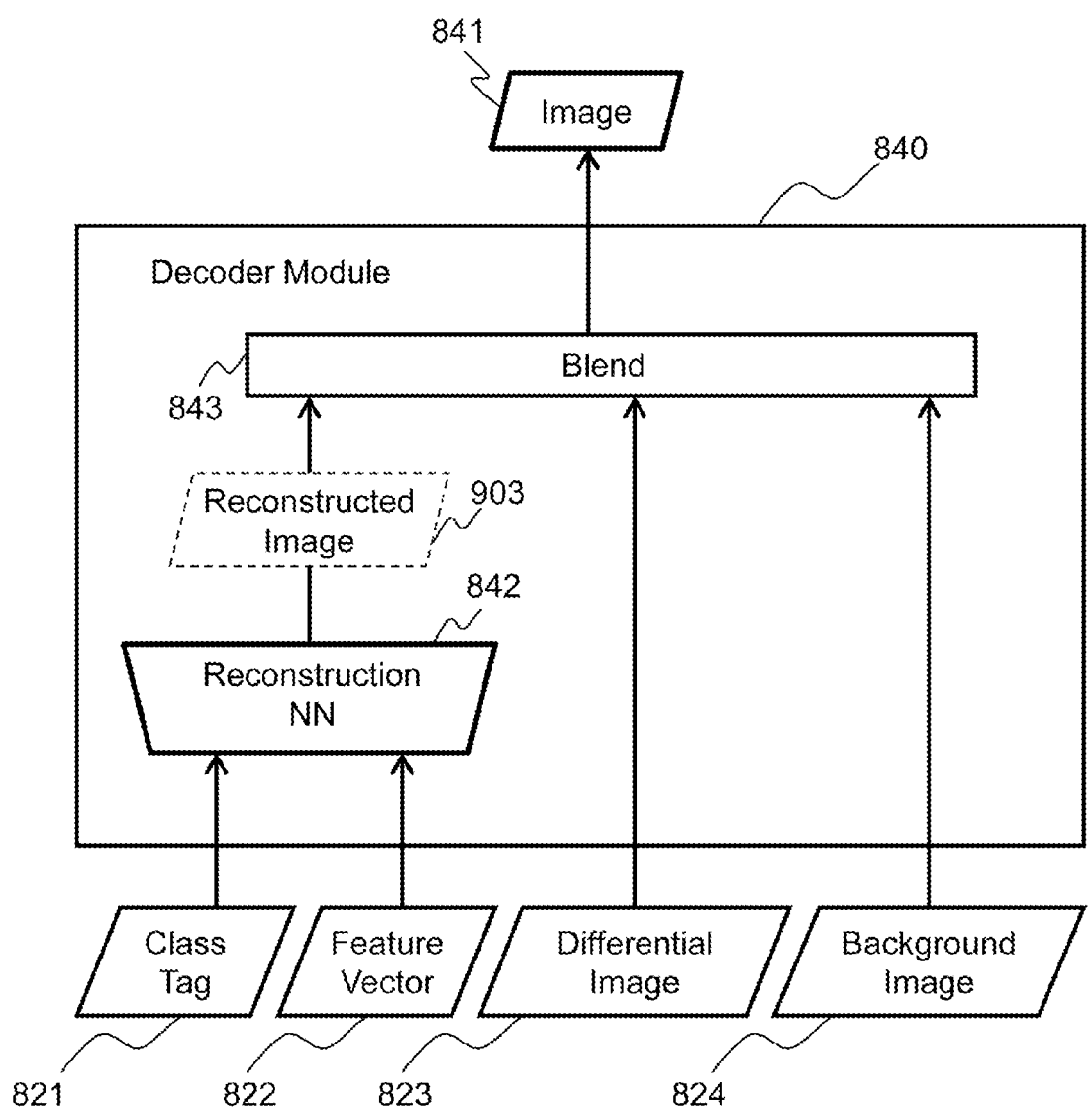
FIG. 12 is a diagram illustrating an example of a process performed in a decoder module, illustrating the second embodiment of the present invention.

FIG. 12 is a diagram illustrating an example of a process performed in the decoder module 840. The reconstruction unit 842 estimates and outputs the reconstructed image 1201 from the class tag 821 and the feature vector 822.

In addition, the blending unit 843 processes the reconstructed image 903, the differential image 823, and the background image 824 and outputs the reproduced image data 841. That is, the blending unit 843 calculates the image data obtained by correcting the reconstructed image 903 with the differential image 823, as the reproduced image of the recognition target image and adds the background image 824 to this recognition target image to reproduce the original image data 141.

Figure 13:
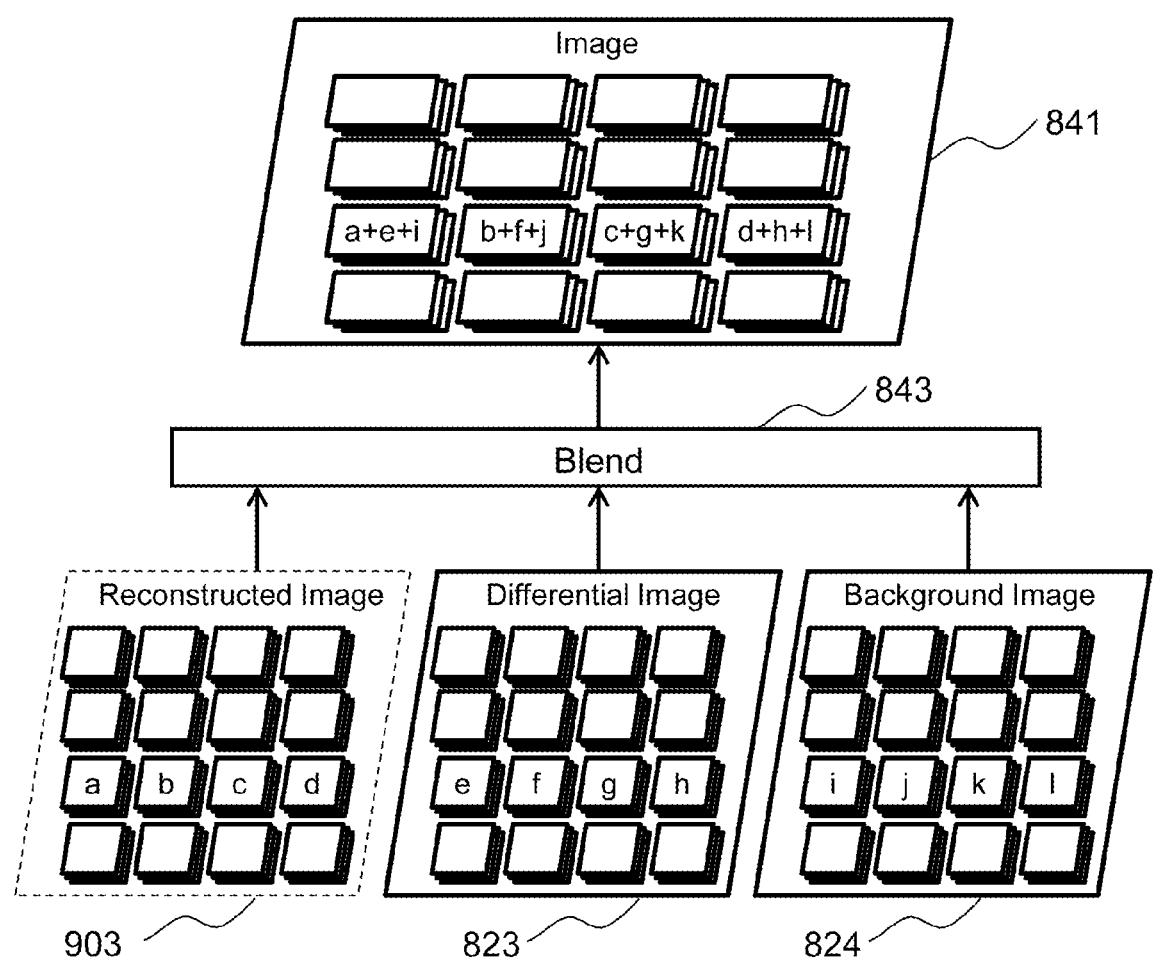
FIG. 13 is a diagram illustrating an example of a process performed in a blending unit, illustrating the second embodiment of the present invention.

FIG. 13 is a diagram illustrating an example of a process performed in the blending unit 843. The blending unit 843 adds the value of the pixel of the reconstructed image 903, the value of the corresponding pixel of the differential image 823, and the value of the corresponding pixel of the background image 824 to output as the reproduced image data 841.

Figure 14:
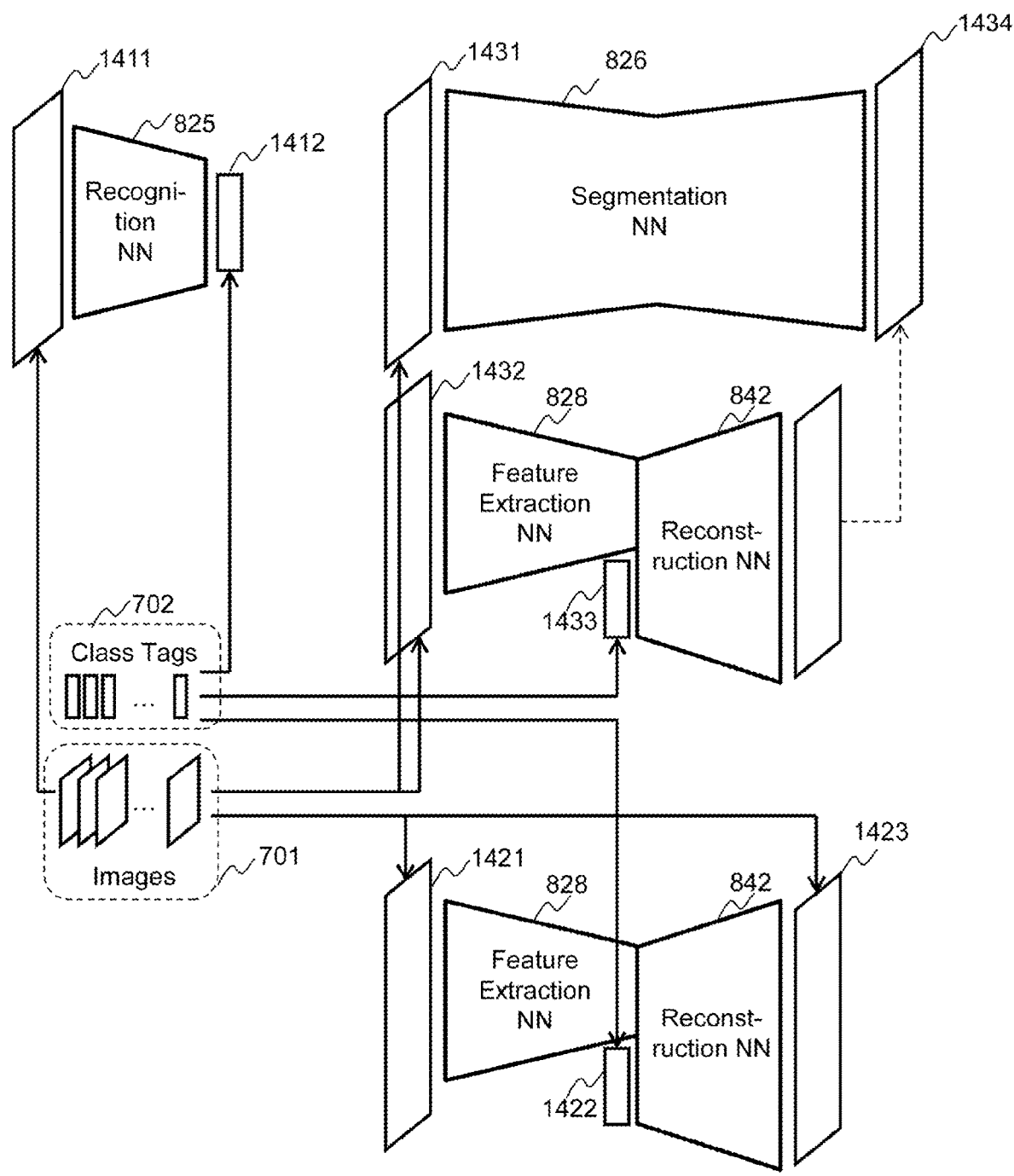
FIG. 14 is a diagram illustrating an example of a process of giving teacher data to neural networks of a recognition unit, a feature extraction unit, a reconstruction unit, and a segmentation unit, illustrating the second embodiment of the present invention.

FIG. 14 is a diagram illustrating an example of how to give teacher data for obtaining the weighting factors beforehand by learning to the recognition unit 825, the segmentation unit 826, the feature extraction unit 828, and the reconstruction unit 842 constituted by the neural networks.

The recognition unit 825 employs an input image group 701 and a class tag group 702 which produces desirable process results for respective images as the teacher data and gives images in the input image group 701 to an input side 1411 of the recognition unit 825. The recognition unit 825 then computes errors between the obtained outputs and the class tags in the class tag group 702 on an output side 1412 as a loss function and updates the weighting factors by the inverse error propagation method. By performing this process a plurality of times, final weighting factors are obtained As in the first embodiment, as the class tag group 702, for example, it is sufficient to give a correct feature quantity corresponding to each one in the input image group 701.

The feature extraction unit 828 and the reconstruction unit 842 learn by the configuration of a neural network in which outputs of the feature extraction unit 828, that is, the feature vector part is linked in a one-by-one manner with a part of inputs to the reconstruction unit 842 except the input part of the class tag group 702, which is also the feature vector part.

The input image group 701 and the class tag group 702 are employed as the teacher data and the images in the input image group 701 are given to the input side 1421 of the feature extraction unit 828 while the class tags in the class tag group 702 are given to an input side 1422 which is a class tag input part of inputs to the reconstruction unit 842. Then, errors between the obtained outputs and the images in the input image group 701 are computed on an output side 1423 of the reconstruction unit 842 as a loss function and the weighting factors are updated by the inverse error propagation method. By performing this process a plurality of times, final weighting factors are obtained The segmentation unit 826 likewise employs the input image group 701 and the class tag group 702 as the teacher data. The images in the input image group 701 are given to an input side 1431 of the segmentation unit 826. Errors between the outputs obtained in the segmentation unit 826 and images serving as references are computed on an output side 1434 as a loss function, where, in a configuration in which the feature extraction unit 828 and the reconstruction unit 842 are linked, images (1434) obtained by giving the images in the input image group 701 to the input side 1432 of the feature extraction unit 828, giving the class tags in the class tag group 702 to the input side 1433 which is the class tag input part of inputs to the reconstruction unit 842, and binarizing the obtained outputs are used as the images serving as references. The weighting factors are updated by the inverse error propagation method and, by performing this process a plurality of times, final weighting factors are obtained.

As described above, in the second embodiment, the class tag 821 including the feature quantity, the feature vector 822 of the recognition target image 902, the differential image 823 including an error between the reconstructed image 903 and the recognition target image 902, and the background image 824 are independently converted into the saved data for each piece of the input image data 111 (frame).

The neural networks of the recognition unit 825, the reconstruction unit 842, the segmentation unit 826, and the feature extraction unit 828 can learn the weighting factors using the inverse error propagation method by giving a pair of the input image group 701 and the class tag group 702 serving as the correct feature quantities as the teacher data as described above. As for the segmentation unit 826, it is possible to calculate the weighting factors by giving, with the input image group 701 as inputs, the output of the reconstruction unit 842 obtained by employing the class tag group 702 and the feature vector 822 (the output of the feature extraction unit 828) as inputs to the output side as the correct answer.

When the image data is reproduced, the original image data 141 can be reproduced on a single frame basis by correcting the reconstructed image 903 generated from the class tag 821 and the feature vector 822 with the differential image 823 and merging the resultant image with the background image 824.

As in the second embodiment, by accumulating an error between the reconstructed image 903 generated from the class tag 821 and the feature vector 822 and the recognition target image 902 output by the separation unit 827 in the saved data as the differential image 823, the accuracy of the image data 141 that has been reproduced can be improved by correcting the reconstructed image 903 with the differential image 823 when the image is reconstructed by the decoder module 840.

Third Embodiment

Figure 15:
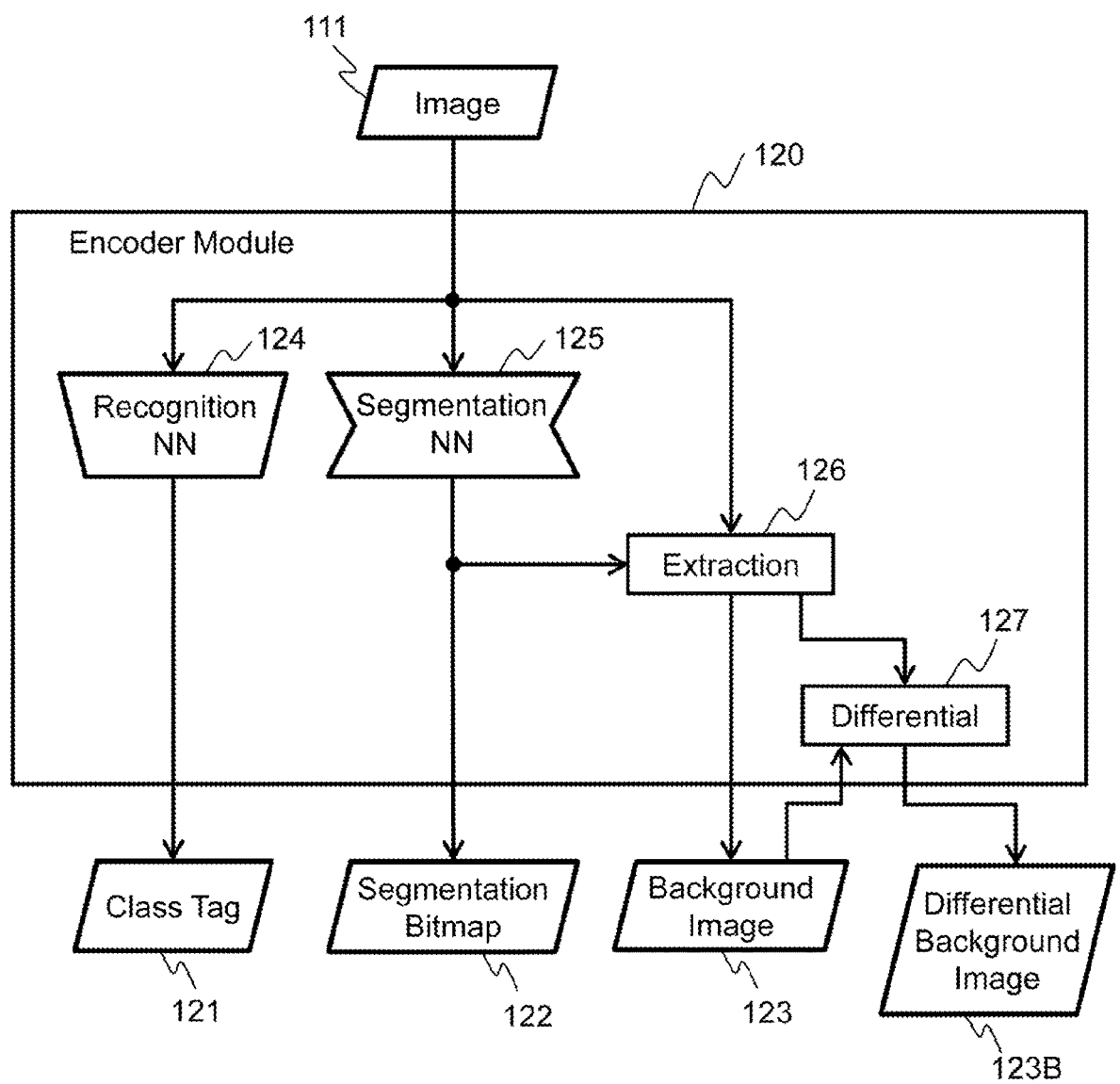
FIG. 15 is a diagram illustrating an example of a process performed in an encoder module, illustrating a third embodiment of the present invention.

FIG. 15 is a diagram illustrating an example of functional elements of an encoder module 120 according to a third embodiment of the present invention. The third embodiment has a configuration in which a differential generation unit 127 is added to the encoder module 120 of the first embodiment described above and other configuration is the same as that of the first embodiment.

The differential generation unit 127 generates a difference between a background image 123 output last time by an extraction unit 126 and a background image output this time by the extraction unit 126 as a differential background image 123B to accumulate in a storage 130. The background image 123 can be generated at a predetermined interval (for example, 30 frames).

When image data 141 is reproduced, a merging unit 143 of a decoder module 140 illustrated in the above-described first embodiment generates a background image of the current frame from the differential background image 123B and the background image 123.

As described above, in the third embodiment, by accumulating the background images as the differential background image 123B in a time-series direction, it is possible to further improve the compression rate of the saved data as a whole with respect to the input image data 111.

Note that, in the information processing apparatuses 100 according to the first to third embodiments, a moving image may be adopted or a still image may be adopted as the input image data 111.

SUMMARY

The invention is not construed to be limited to the aforementioned embodiments and includes various types of variations. For example, the aforementioned embodiments have been mentioned in detail in order to make the description of the invention easy to understand. Therefore, the embodiments are not necessarily limited to the ones provided with the whole configurations that have been described. In addition, part of the configuration of a certain embodiment can be replaced with the configuration of another embodiment, while it is also possible to add the configuration of a certain embodiment to the configuration of another embodiment. Furthermore, all of addition, deletion, and replacement of another configuration can be applied alone or in combination to part of the configuration of each embodiment.

Additionally, part or all of the respective configurations, functions, processing units, processing means, and the like described above may be implemented by hardware designed, for example, using an integrated circuit. The respective configurations, functions, and the like described above may be implemented by software in which a processor parses a program that implements each of the functions to execute. Information such as the programs, the tables, and the files that implement the respective functions can be placed on a recording device including a memory, a hard disk, and a solid state drive (SSD), or alternatively, a recording medium including an IC card, an SD card, and a DVD.

Meanwhile, the control lines and the information lines considered to be necessary for the description are indicated and therefore, all of the control lines and the information lines on a product are not necessarily indicated. Actually, substantially all of the configurations may be considered to be connected to each other.

What is claimed is:

1. An information processing apparatus including a processor and a memory and being configured to convert image data that has been input into saved data to save in a storage unit and reproduce the image data from the saved data, the information processing apparatus comprising:
an encoder unit configured to convert the image data into the saved data; and
a decoder unit configured to reproduce the saved data as the image data,
wherein the encoder unit includes:
a recognition unit configured to generate class tag information from the image data that has been input;
a segmentation unit configured to generate region information that distinguishes a recognition target region and a background region from the image data that has been input;
a region separation unit configured to generate a background image according to the background region from the image data that has been input based on the region information;
a feature extraction unit configured to generate a feature vector from the image data that has been input;
a reconstruction unit configured to generate a reconstructed image from the class tag information and the feature vector;
a region separation unit configured to generate a recognition target image and a background image from the image data that has been input and the region information; and
a differential extraction unit configured to generate a recognition differential image from the recognition target image and the reconstructed image,
the encoder unit outputs the saved data including the class tag information, the feature vector, the recognition differential image, and the background image, and
wherein the decoder unit includes:
a reconstruction unit configured to read the saved data and generate a reconstructed image from the class tag information and the feature vector; and
a merging unit configured to merge the recognition differential image, the background image, and the reconstructed image read from the saved data and reproduce the image data.

2. The information processing apparatus according to claim 1, wherein
the saved data including the class tag information, the region information, and the background image is stored in a storage device.

3. The information processing apparatus according to claim 1, wherein the storage unit is configured to store the saved data including the class tag information, the region information, and the background image generated by the encoder unit.

4. The information processing apparatus according to claim 1, wherein
the recognition unit, the segmentation unit, and the reconstruction unit include neural networks.

5. The information processing apparatus according to claim 4, wherein in the neural networks of the recognition unit, the segmentation unit, and the reconstruction unit, weights for the neural networks are set through learning by inverse error propagation using teacher data, and the teacher data includes a pair of preset learning image data and learning class tag information.

6. The information processing apparatus according to claim 4, wherein the recognition unit generates a class tag including a feature quantity of the image data from the image data that has been input.

7. The information processing apparatus according to claim 1, further comprising a differential generation unit configured to generate a differential background image from the background image output by the region separation unit and the background image that has been output last time by the region separation unit.

8. The information processing apparatus according to claim 1, wherein the storage unit is configured to store the saved data including the class tag information, the feature vector, the recognition differential image, and the background image generated by the encoder unit.

9. The information processing apparatus according to claim 1, wherein the recognition unit, the feature extraction unit, the segmentation unit, and the reconstruction unit include neural networks.

10. The information processing apparatus according to claim 9, wherein in the neural networks of the recognition unit, the feature extraction unit, the segmentation unit, and the reconstruction unit, weights for the neural networks are set through learning by inverse error propagation using teacher data, and the teacher data includes a pair of preset learning image data and learning class tag information.

11. The information processing apparatus according to claim 9, wherein the recognition unit generates a class tag including a feature quantity of the image data from the image data that has been input.

12. The information processing apparatus according to claim 1, wherein the reconstruction unit of the encoder unit is the same as the reconstruction unit of the decoder unit.

13. A processing method for image data wherein a computer including a processor and a memory converts image data that has been input into saved data to save in a storage unit and reproduces the image data from the saved data, the processing method comprising:

generating class tag information from the image data that has been input;

generating region information that distinguishes a recognition target region and a background region from the image data that has been input;

generating a background image excluding the recognition target region from the image data that has been input based on the region information;

generating a feature vector from the image data that has been input;

generating a reconstructed image from the class tag information and the feature vector;

generating a recognition target image and a background image from the image data that has been input and the region information; and generating a recognition differential image from the recognition target image and the reconstructed image, wherein the computer outputs the saved data including the class tag information, the feature vector, the recognition differential image, and the background image, the processing method further comprising:

reading the saved data and generating a reconstructed image from the class tag information and the feature vector; and merging the recognition differential image, the background image, and the reconstructed image read from the saved data and reproduce the image data.

14. The processing method for image data according to claim 13, further comprising:

storing the saved data including the class tag information, the region information, and the background image in a storage device.

* * * * *